United States Patent
Ji et al.

(10) Patent No.: US 7,014,165 B2
(45) Date of Patent: Mar. 21, 2006

(54) FLOW CONTROL VALVE AND FLOW CONTROL VALVE APPARATUS USING THE SAME

(75) Inventors: Chang Hyeon Ji, Seoul (KR); Young Joo Yee, Kyeonggi-do (KR); Jeong Hoon Choi, Kyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/887,157

(22) Filed: Jul. 7, 2004

(65) Prior Publication Data

US 2005/0006612 A1    Jan. 13, 2005

(30) Foreign Application Priority Data

Jul. 7, 2003    (KR) ...................... 10-2003-0045801

(51) Int. Cl.
*F16K 1/20* (2006.01)
(52) U.S. Cl. .................... 251/65; 251/129.01; 251/303
(58) Field of Classification Search .................. 251/65, 251/129.01, 129.06, 298, 303
See application file for complete search history.

(56) References Cited

U.S. PATENT DOCUMENTS

| | | | | |
|---|---|---|---|---|
| 2,901,623 A | * | 8/1959 | Wouters | 251/129.06 |
| 3,570,807 A | * | 3/1971 | Sturman et al. | 251/65 |
| 4,585,209 A | * | 4/1986 | Aine et al. | 251/129.02 |
| 5,040,567 A | * | 8/1991 | Nestler et al. | 251/129.2 |
| 5,441,597 A | * | 8/1995 | Bonne et al. | 216/2 |
| 5,619,177 A | * | 4/1997 | Johnson et al. | 251/129.01 |
| 5,899,218 A | * | 5/1999 | Dugan | 251/129.01 |
| 5,941,501 A | * | 8/1999 | Biegelsen et al. | 251/129.01 |
| 5,964,242 A | * | 10/1999 | Slocum | 251/11 |
| 6,311,951 B1 | * | 11/2001 | Samulowitz | 251/129.16 |
| 6,439,233 B1 | * | 8/2002 | Geertsema | 251/298 |

* cited by examiner

*Primary Examiner*—John Bastianelli
(74) *Attorney, Agent, or Firm*—Lee, Hong, Degerman, Kang & Schmadeka

(57) ABSTRACT

A flow control valve apparatus using a flow control valve manufactured via micro-machining is provided. The flow control valve has a substrate defining at least one orifice through which a fluid can flow, a support member formed on a first surface of the substrate, at least one flap corresponding to the at least one orifice, a pair of elastic flexures connecting the support member to the at least one flap, and a driving means for displacing the at least one flap between the first and second positions to control fluid flow through the at least one orifice. The support member is formed adjacent to the at least one orifice and the at least one flap extends from the support member to fittingly engage the at least one orifice in a first and second position. Also, the pair of elastic flexures provides an elastic restorative force proportional to a displacement of the at least one flap between the first and second positions.

23 Claims, 17 Drawing Sheets

FLOW CONTROL VALVE AND FLOW CONTROL VALVE APPARATUS USING THE SAME

CROSS REFERENCE TO RELATED APPLICATIONS

Pursuant to 35 U.S.C. § 119(a), this application claims the benefit of earlier filing date and right of priority to the Korean Patent Application No. 2003-45801, filed on Jul. 7, 2003, the content of which is hereby incorporated by reference in its entirety.

BACKGROUND OF THE INVENTION

1. Field of the Invention

The present invention relates to a flow control valve and flow control valve apparatus, and more particularly, to a miniaturized flow-control valve to precisely control a flow rate and a flow control valve apparatus utilizing such a flow control valve.

2. Description of the Related Art

Flow control valves and apparatuses using flow control valves for controlling fluid flowing through a flow channel have been applied to many industrial fields including the manufacture of household appliances.

In general, a conventional flow control valve apparatus controls flow by moving a pin shaped valve rod from an orifice a predetermined distance to linearly control the opened area of the orifice. Typically, a valve rod is connected to a gear, which is connected to a rotor shaft of a stepping motor. The displacement of the valve rod can be varied in proportion to the number of pulses of the driving power. However, such a flow control valve apparatus has a high production cost due to the relatively high price of a stepping motor as well as the difficulty in hermetically sealing the rotor shaft of the stepping motor and the flow channel where the valve rod is positioned.

Another type of flow control valve apparatus has a diaphragm or a membrane installed in a part of the valve rod, wherein a compressive space is provided on a rear surface of the diaphragm or the membrane. The diaphragm deforms because of an expansion pressure, which is due to the heating of a fluid filled in the compressive space. This deformation resultingly controls the displacement of the valve rod. However, this flow control valve apparatus is difficult to miniaturize due to the addition of the separate compressive space. Furthermore, a valve response speed for a linear operation is lowered by using an expansion pressure caused by the heating of the compressive space. Accordingly, power consumption is increased due to the heat radiation necessary to maintain the valve's response speed.

Another type of flow control valve uses a solenoid coil. However, this type has difficulty in the linear control of the fluid due to an instable valve rod, and has problems of complicated parts and serious noise occurrence during the opening and closing operation thereof.

There is another type of conventional art flow control valve, which is manufactured by a micro-machining technology and which controls the flow rate by driving a diaphragm or flap formed on a location spaced away from an opening of the valve. That is, the opening of the valve is controlled by driving the flap or diaphragm. In order to drive the flap or diaphragm, a variety of driving methods such as an electrostatic driving method, a heat driving method, a piezoelectric driving method, and the like have been used.

In this type of flow control valve, input and output flow channels are not arranged in a straight line but in parallel in a direction where the fluid is inputted or outputted. Accordingly, there is a limitation in controlling the flow rate even when the flow rate is controlled by the diaphragm or flap. Furthermore, an analog method is proper for driving the diaphragm or flap rather than a digital method.

SUMMARY OF THE INVENTION

Accordingly, the present invention is directed to a flow control valve that substantially obviates one or more problems due to limitations and disadvantages of the related arts.

An object of the present invention is to provide a flow control valve that is manufactured by a micro-machining technology and designed to precisely control a flow rate.

Another object of the present invention is to provide a flow control valve system that can allow a flow control valve to be used as a linear expansion valve for adjusting a flow rate, to allow an adiabatic expansion, and to provide a cooling property by disposing the flow control valve in a flow channel.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a flow control valve comprising a substrate defining at least one orifice through which a fluid can flow; a support member formed on a first surface of the substrate, wherein the support member is formed adjacent to the at least one orifice; at least one flap corresponding to the at least one orifice, wherein the at least one flap extends from the support member to fittingly engage the at least one orifice in a first and second position; a pair of elastic flexures connecting the support member to the at least one flap, wherein the pair of elastic flexures provides an elastic restorative force proportional to a displacement of the at least one flap between the first and second positions; and a driving means for displacing the at least one flap between the first and second positions to control fluid flow through the at least one orifice.

According to one embodiment of the present invention, when the flap is displaced in the first position, the fluid flow through the at least one orifice is minimized. Also, when the flap is displaced in the second position, the fluid flow through the at least one orifice is maximized. Furthermore, the driving means may comprise a pair of electrode pads formed a distance apart on a first surface of the support member; a coil having first and second ends electrically connected to the pair of electrode pads, respectively, wherein the coil is formed on a first surface of the flap; at least one permanent magnet disposed above the flap; and at least one permanent magnet disposed below the flap.

According to another embodiment of the present invention, the flow control valve may further comprise further comprising a pair of connecting members, wherein each connecting member is formed on each elastic flexure to connect the pair of electrode pads to the coil. Also, the flow control valve may further comprise a plurality of orifices and a corresponding plurality of flaps, wherein the plurality of orifices have approximately equivalent areas and the rate of fluid flow is controlled by displacing each of the plurality of flaps individually.

According to another aspect of the present invention, there is provided a flow control apparatus that comprises an upper housing comprising an inlet flow channel; a lower housing comprising a outlet flow channel, wherein the lower housing is coupled to the upper housing to form a space therein; a flow control valve mounted within the space defined by the upper and lower housings and comprising at least one flap which is displaced by an electromagnetic force to control the rate of fluid flow entering through the inlet flow channel; and a pair of permanent magnets, wherein each permanent magnet comprises at least one orifice and is disposed above and under the flow control valve, respectively.

It is to be understood that both the foregoing general description and the following detailed description of the present invention are exemplary and explanatory and are intended to provide further explanation of the present invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
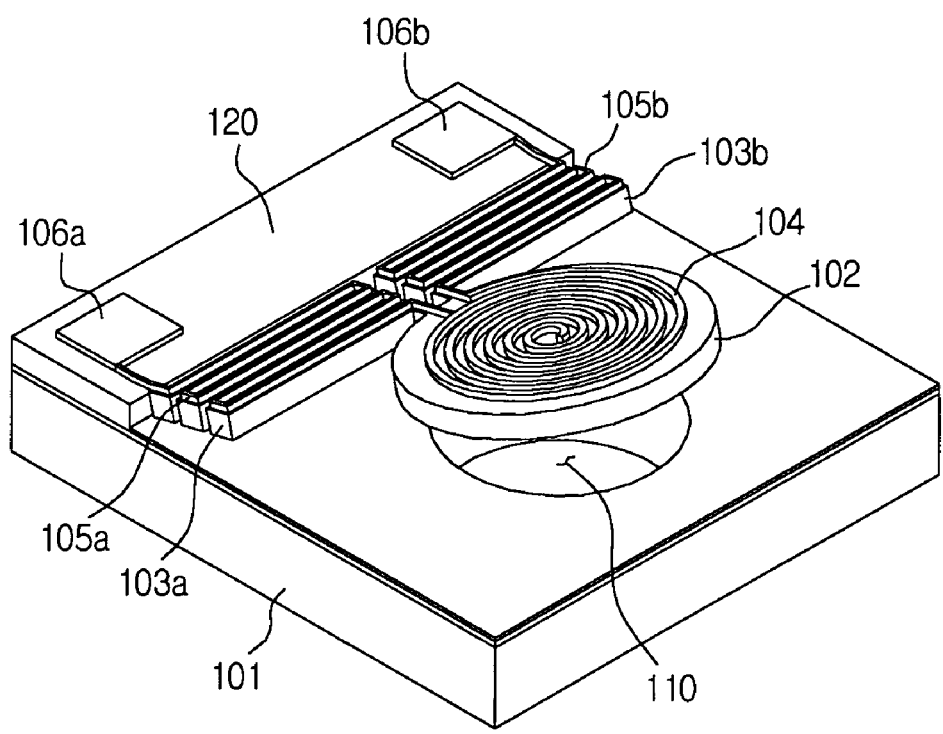
FIG. 1 is a perspective view of a flow control valve according to one embodiment of the present invention, in an opened state.
Figure 2:
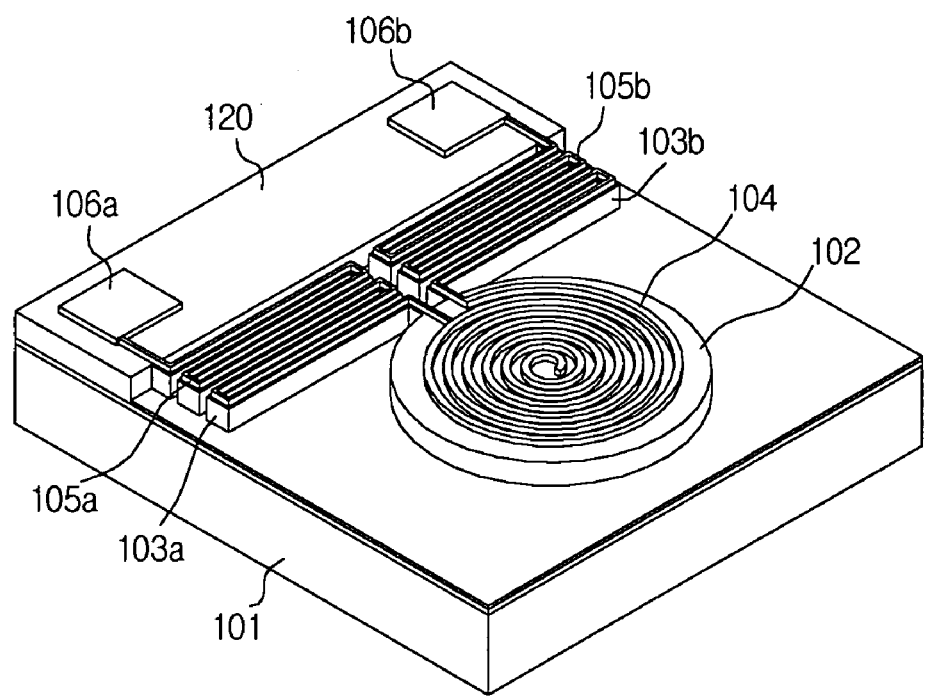
FIG. 2 is a perspective view of a flow control valve according to one embodiment of the present invention, in a closed state.

FIG. 1 illustrates a flow control valve according to an embodiment of the present invention, wherein an orifice 110 is in an opened state. FIG. 2 shows a flow control valve according to an embodiment of the present invention, wherein the orifice 110 is in a closed state. The embodiments exemplified in FIGS. 1 and 2 illustrate a single orifice; however, a plurality of orifices may be provided.

As shown in FIGS. 1 and 2, the flow control valve comprises a substrate 101 provided with an orifice 110 through which fluid passes. A support member 120 is formed on the substrate 101. A flap 102 extends from the support member 120 and corresponds to the orifice 110 in an operational relationship to open and close the orifice 110. The flow control valve further comprises a pair of elastic flexures 103a and 103b connecting the support member 120 to the flap 102. The pair of elastic flexures 103a and 103b provides elastic restoration force proportional to the displacement of the flap 102. Also, a pair of electrode pads 106a and 106b is formed on the support member 120, wherein the pads 106a and 106b are spaced away from each other. A coil 104 is installed on the support member 120 and has first and second ends that are electrically connected to the electrode pads 106a and 106b, respectively.

Preferably, the flow control valve of the present invention is manufactured through a micro-machining technology. Furthermore, the substrate 101, support member 120, elastic flexures 103a and 103b, and the flap 102 preferably comprise silicon. Also, an oxide layer is formed between the substrate 101 and the support member 120. Preferably, there would be an absence of an oxide layer between the elastic flexures 103a and 103b and the substrate 101 and between the flap 102 and the substrate 101. As a result of the absence of the oxide layer, a gap is defined between the elastic flexures 103a and 103b and the substrate 101 and between the flap 102 and the substrate 101. Accordingly, the elastic flexures 103a and 103b and the flap 102 are allowed to vertically move relative to the substrate 101.

The support member 120 is preferably disposed at an edge of the substrate 101 to support the elastic flexures 103a and 103b and the flap 102. As exemplified in FIGS. 1 and 2, the flap 102 is preferably formed in a circular shape corresponding to the circular orifice 110. Alternative shapes, such as octagonal or square, may be used for the flap and the orifice in other embodiments. A diameter of the orifice 110 is preferably less than that of the flap 102 so that the flap 102 can fully close the orifice 110. First ends of the elastic flexures 103a and 103b are connected to the support member 120 and second ends thereof are connected to the flap 102. The elastic flexures 103a and 103b are preferably formed in a zigzag shape to provide an elastic restorative force. Accordingly, when the flap 102 is displaced away and upward from the orifice 110, the elastic flexures 103a and 103b exert a downward elastic restorative force proportional to the displacement of the flap 102.

The elastic flexures 103a and 103b preferably comprise a cantilever or a torsion beam. A pair of connecting wires 105a and 105b are respectively patterned on the elastic flexures 103a and 103b to connect the electrode pads 106a and 106b to the coil 104. The electrode pads 106a and 106b, connecting wires 105a and 105b and coil 104 preferably comprise a conductive material. Furthermore, the electrode pads 106a and 106b are respectively disposed on opposing edges of the support member 120. An electric current is applied to the electrode pads 106a and 106b and is transmitted to the coil 104 through the connecting wires 105a and 105b.

Figure 3:
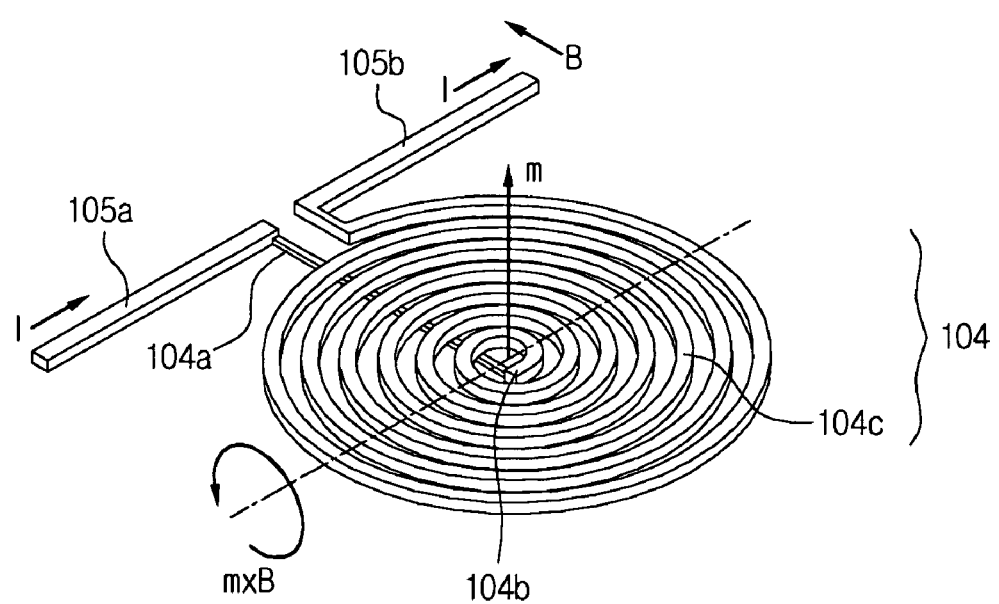
FIG. 3 is a perspective view of a coil depicted in FIGS. 1 and 2.

The coil 104 is exemplified in FIGS. 1, 2 and 3 to be spirally formed on the flap 102. As shown in FIG. 3, the coil 104 comprises a core portion 104b, an upper conductive line 104c extending from the core portion 104b, and a lower conductive line 104a connected to the core portion 104b. The lower and upper conductive lines 104a and 104c are respectively connected to the connecting wires 105a and 105b. The lower conductive line 104a is insulated from the upper conductive line 104c by, for example, a well known insulating layer, or by being spaced from the upper conductive line 104c.

A permanent magnet (not shown) is disposed above and under the flap 102. The magnets generate an external magnetic field (i.e., a magnetic flux density B). In one embodiment, the magnetic flux density B is generated in a horizontal direction toward the support member 120. Where "m" is the magnetic dipole moment, the external magnetic field and a secondary magnetic field created as a result of the current "I" flowing along the coil 104 react to apply a predetermined torque (m×B). The direction and intensity of a resulting electromagnetic force applied to the flap 102 is a function of the controlling direction and intensity of the current "I" applied to the coil 104 and direction and intensity of the external magnetic field generated by the magnets. However, since the magnetic flux density generated by the magnets is fixed, the direction and intensity of the electromagnetic force are primarily determined by the direction and intensity of the current "I" applied to the coil 104.

The operation of the above-described flow control valve will be described hereinafter with reference to FIG. 3.

The current applied through the first connecting line 105a is directed to the second connecting line 105b via the coil 104, i.e., via the lower conductive line 104a, the core portion 104b and the upper conductive line 104c. The magnetic dipole moment "m" is generated in a vertical direction and perpendicular to the core 104b by the current spirally flowing along the coil 104 in a counterclockwise direction. In addition, when it is assumed that the magnetic flux density B is generated toward the support member 120 by the permanent magnets, the predetermined torque (m×B) is generated by the reaction of the magnetic dipole moment "m" and the magnetic flux density B. When the current flows in an opposite direction, the current flows in a direction opposite to that described above.

Accordingly, since a first surface of the flap 102 is coupled to the coil 104, which is fixed by the elastic flexures 103a and 103b, the flap 102 is displaced upward as the result of the reaction between the two magnetic fields. Therefore, as the flap is displaced upward, the orifice 110 is opened. The displacement of the flap 102 can be adjusted according to the intensity of the current "I" applied to the coil 104.

Figure 4A:
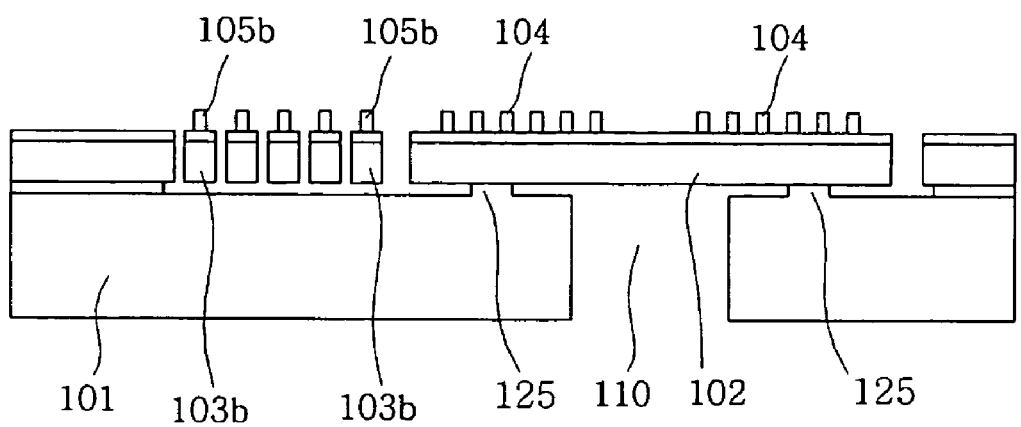
FIGS. 4A and 4B are views illustrating a method for tightly closing an orifice using a flap of a flow control valve depicted in FIGS. 1 and 2.
Figure 4B:
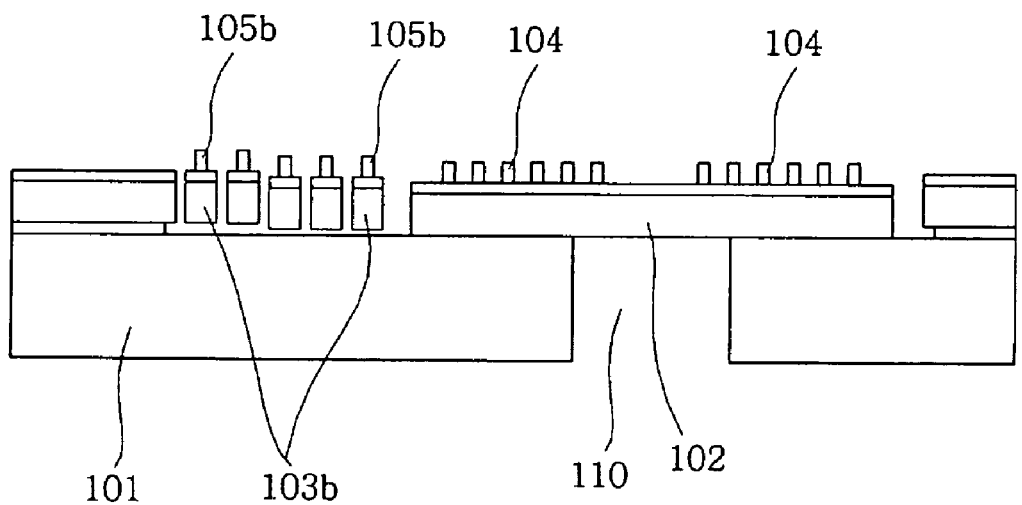

FIGS. 4A and 4B show a process for tightly closing an orifice using a flap of the flow control valve depicted in FIGS. 1 and 2. In FIG. 4A, the substrate 101 is provided with a compressible flange-like valve seat 125 corresponding to a circular edge of the flap 102. The flap 102 engages the valve seat 125 to tightly seal the orifice 110. In FIG. 4B, the intensity and direction of the current applied to the coil 104 generate an electromagnetic force. This force is capable of allowing the flap 102 to compress the valve seat 125 and forcibly contact the top surface of the substrate 101 to fully close the orifice 110.

Figure 5:
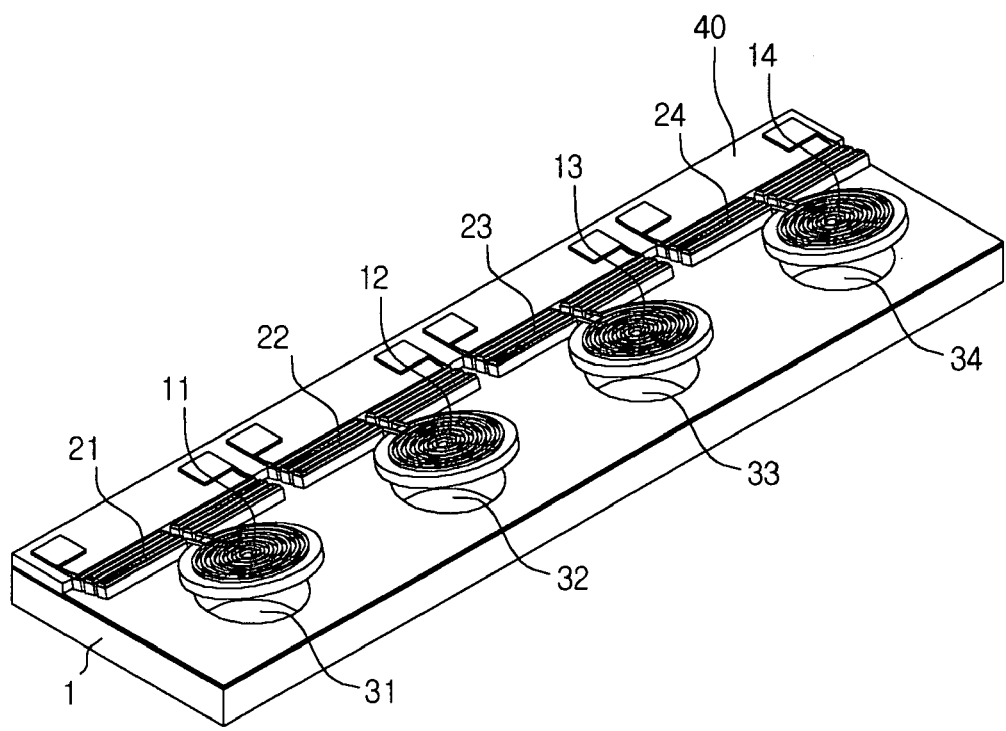
FIGS. 5 and 6 are perspective views of flow control valves with a plurality of orifices according to an alternative embodiment of the present invention.
Figure 6:
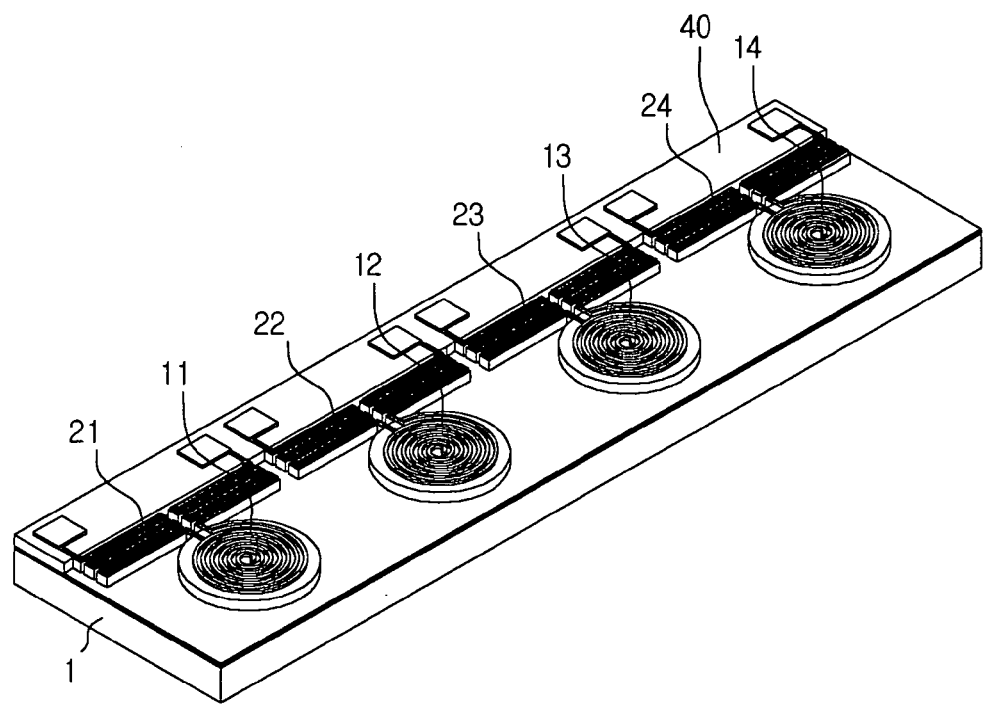

FIG. 5 illustrates a flow control valve with a plurality of orifices according to an alternative embodiment of the present invention, wherein the orifices are in an opened state. FIG. 6 illustrates a flow control valve with a plurality of orifices according to an alternative embodiment of the present invention, wherein the orifices are in a closed state. The number of orifices, which is exemplified in FIGS. 5 and 6 as four, may vary.

In FIG. 5, first to fourth orifices 31 to 34 are provided on the substrate 1. First to fourth flaps 11 to 14 correspond to the first to fourth orifices 31 to 34, respectively. First to fourth pairs of elastic flexures 21 to 24 are respectively connected to the first to fourth flaps 11 to 14. First to fourth pairs of electrode pads (corresponding to 103a and 103b of FIG. 1) are also provided. With respect to the electrode pads individually in this example of four orifices, the ratio of positive electrodes to negative electrodes may be in a range of approximately 4:4 to 7:1.

Referring to FIG. 5, when the flaps 11 to 14 are displaced to the uppermost position, all of the orifices 31 to 34 are opened so as to allow fluid to pass through. Referring to FIG. 6, when the flaps 11 to 14 are displaced to the lowermost position, all of the orifices 31 to 34 are closed so as to prevent fluid from passing through. Flaps 11 to 14 may be independently controlled to more precisely control the flow rate.

Figure 7A:
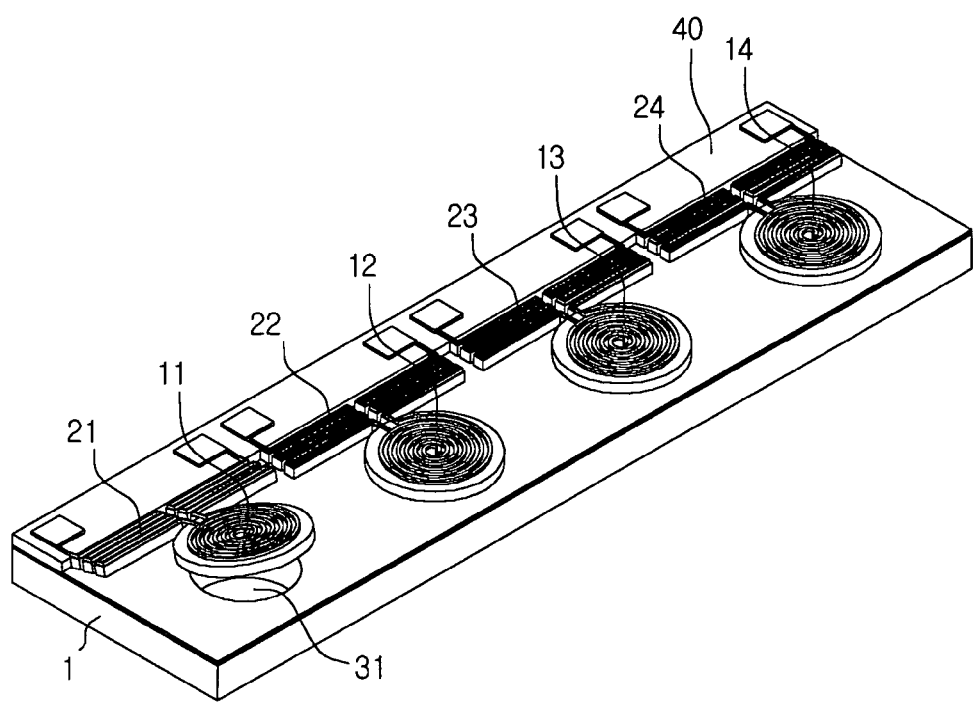
FIGS. 7A and 7B are perspective views of a flow control valve depicted in FIGS. 5 and 6, illustrating a method for controlling a flow rate when diameters of the orifices are identical to each other and each of the orifices is fully opened and closed.
Figure 7B:
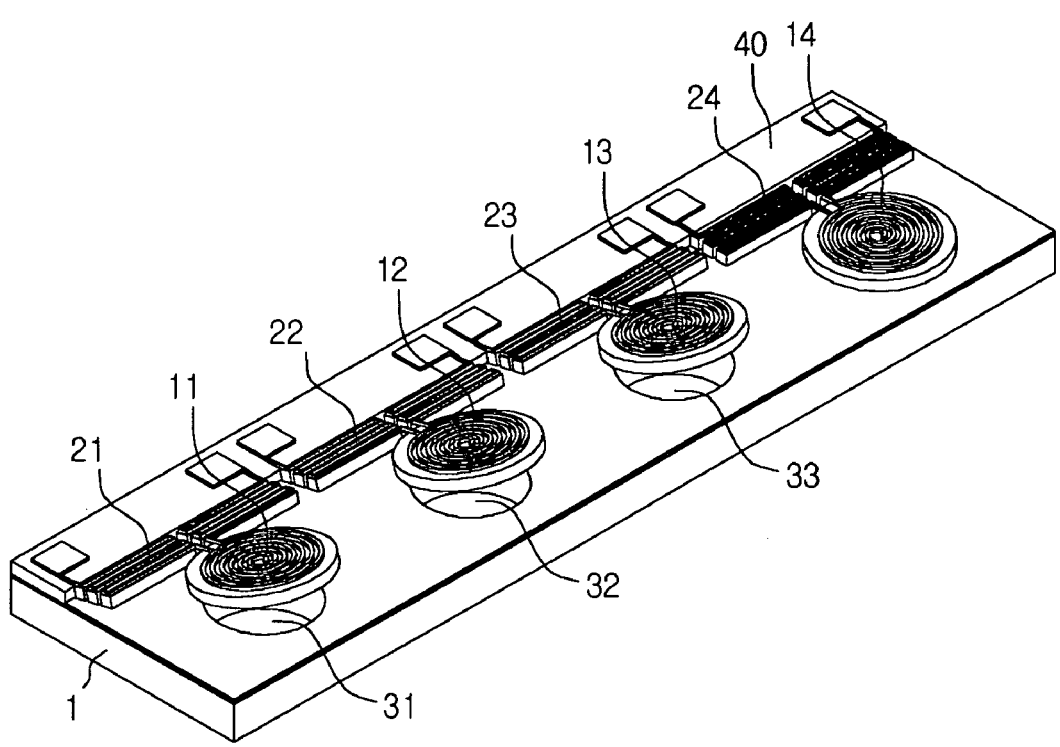

FIGS. 7A and 7B show the flow control valve depicted in FIGS. 5 and 6, and illustrate a method for controlling a flow rate when diameters of the orifices are identical to each other.

Referring to FIG. 7A, when the first flap 11 is opened, a fluid can pass through the first orifice 31 corresponding to the first flap 11. Presuming that the flow volume through a single orifice is "X," referring to FIG. 7B, when the first to third flaps 11, 12 and 13 are opened, the fluid can pass through the first to third orifices 31, 32 and 33 corresponding to the first to third flaps 11, 12 and 13. Accordingly, the flow volume through the entire system is "3X," provided that flaps 11–13 in FIG. 7B are opened an amount approximately equivalent to the amount flap 11 is opened in FIG. 7A.

Accordingly, when the number of orifices is "M (a predetermined natural number)," the flow volume can be controlled in M+1 steps. That is, as shown in FIGS. 7A and 7B, when the flaps are independently controlled, the flow volume can be controlled in 5 steps from 0X (where all of the flaps are closed) to 4X (where all of the flaps are opened) by an amount difference of "X."

Figure 8A:
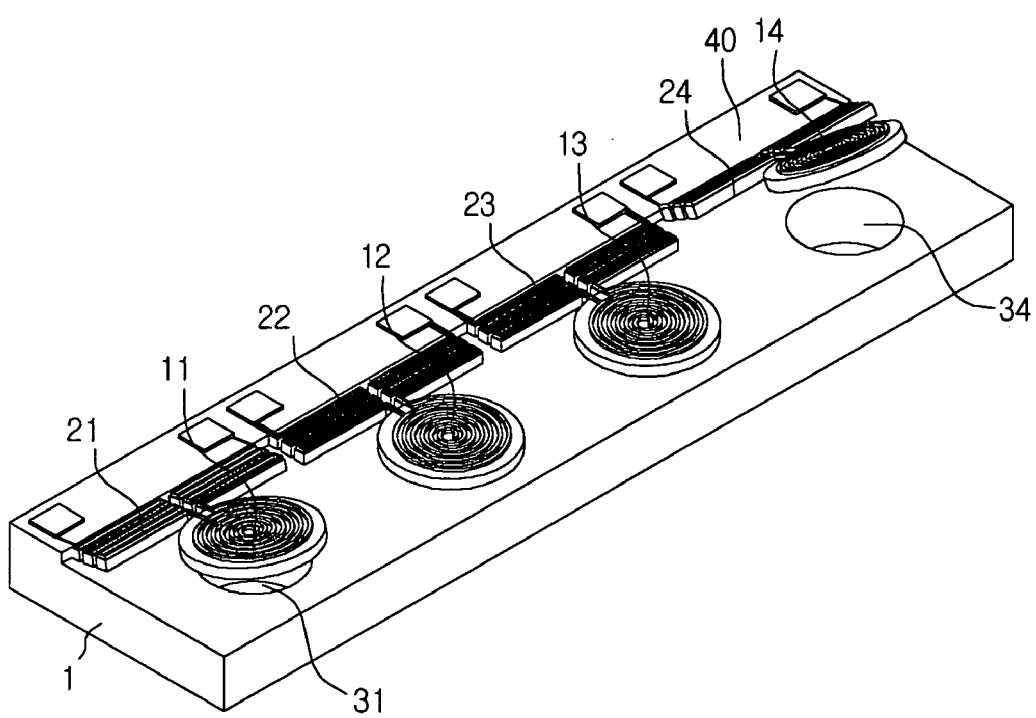
FIGS. 8A and 8B are perspective views of a flow control valve depicted in FIGS. 5 and 6, illustrating an alternative method for controlling a flow rate when diameters of the orifices are identical to each other and the displacements of the flaps are different from each other.
Figure 8B:
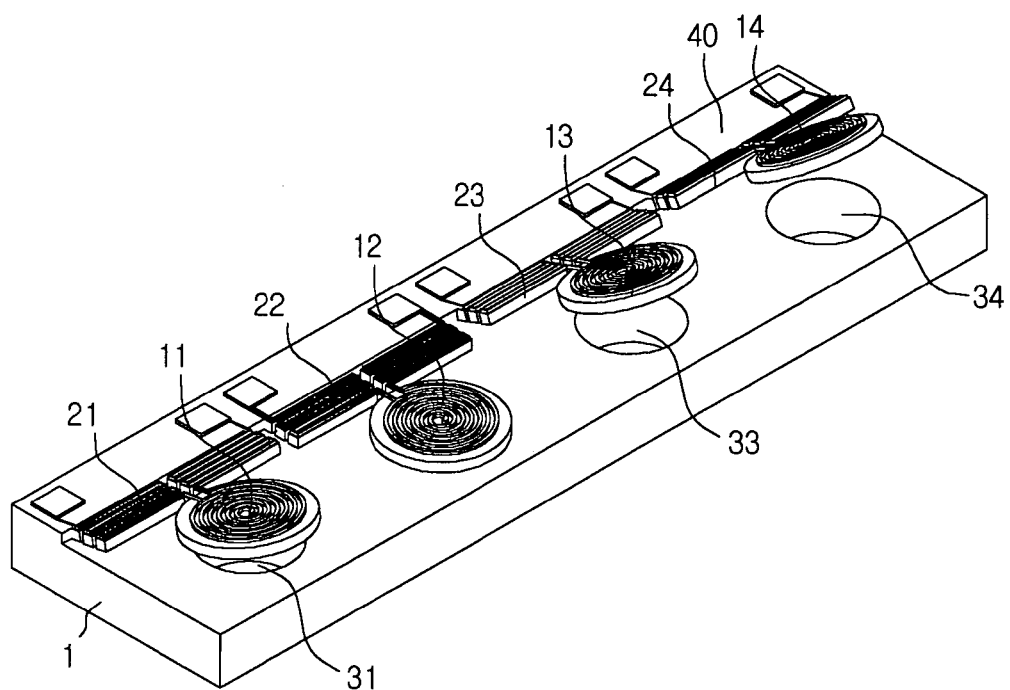

FIGS. 8A and 8B illustrate the flow control valve depicted in FIGS. 5 and 6, wherein an alternative method for controlling a flow volume is shown. In this embodiment, the diameters of the orifices are approximately equivalent to each other, but the displacements of the flaps from the orifices are different. As shown, the displacement of each of the flaps 11 to 14 varies, due to a difference in the amount of current applied to each of the first to fourth flaps 11 to 14. It is preferable that the displacement of each of the flaps 11 to 14 is increased as it goes from the first flap 11 to the fourth flap 14 (i.e., the amount of current applied to the first to fourth flaps 11 to 14 is increased as it goes from the first flap 11 to the fourth flap 14).

In one embodiment, it is preferable that the displacement of each of the flaps 11 to 14 is increased such that the flow volume is increased by $2^N$ (N=0, 1, 2, . . . ), for example, as it goes from the first flap to the fourth flap. Accordingly, if the maximal flow volume that can be controlled by the first orifice 31 is "X," the maximal flow volume that can be controlled by the second orifice 32 becomes "2X," the maximal flow volume by the third orifice 33 becomes "4X," and the maximal flow volume by the fourth orifice 34 becomes "8X." Since the flaps are independently operated, the four flaps corresponding to the four orifices can control the flow volume in $2^4(=16)$ steps.

For example, as shown in FIG. 8A, when the first and fourth flaps 11 and 14 are opened, the flow volume through the first and fourth orifices 31 and 34 becomes "X+8X." As shown in FIG. 8B, when the first, third and fourth flaps 11, 13 and 14 are opened, the flow volume through the first, third and fourth orifices 31, 33 and 34 becomes "X+4X+8X." Thus, when the flaps are independently controlled, the flow volume can be controlled by "X" volume in 16 steps from 0X (where all of the flaps are closed) to 15X (where all of the flaps are opened). Furthermore, when the number of orifices is "M (a predetermined natural number)," the flow volume may be controlled in $2^M$ steps, for example.

Figure 9:
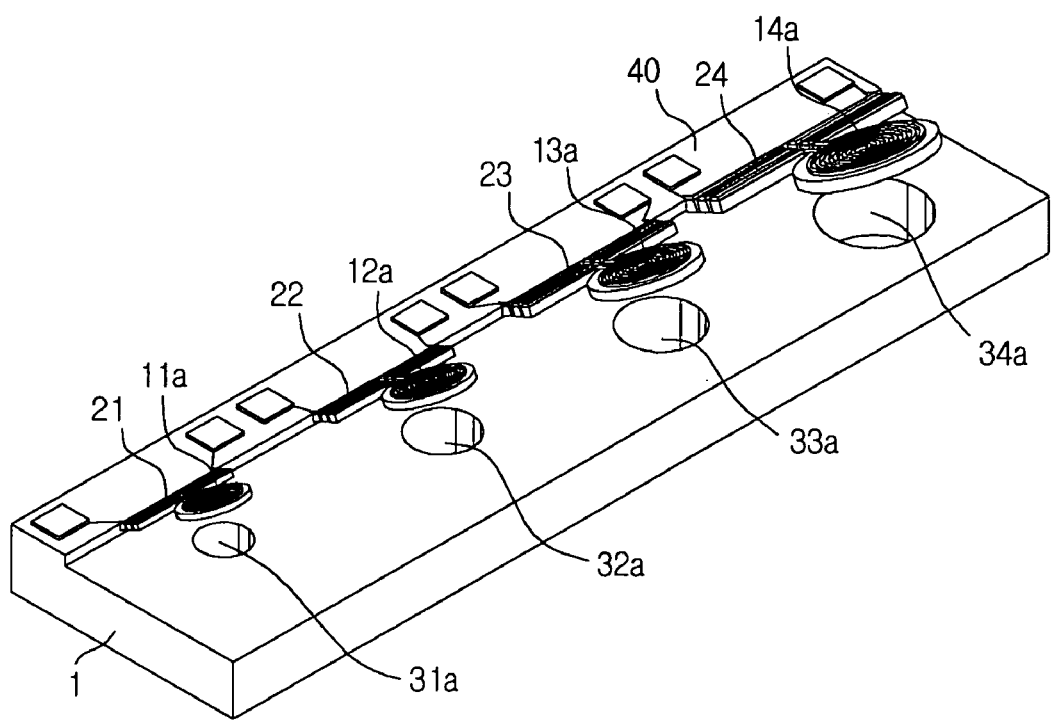
FIG. 9 is a perspective view of a flow control valve according to an alternative embodiment of the present invention.

FIG. 9 shows a flow control valve according to an alternative embodiment of the present invention. As exemplified in FIG. 9, first to fourth orifices 31a, 32a, 33a and 34a formed on the substrate 1 differ in diameter so that the diameter of the orifices increases from the first to fourth orifices. Similarly, first to fourth flaps 11a, 12a, 13a and 14a (for respectively opening and closing the first to fourth orifices 31a, 32a, 33a and 34a) also differ in diameter so that the diameter of the orifices increases from the first to fourth orifices.

In this embodiment, the diameters of the orifices 31a to 34a are determined such that the flow volume can be increased by $2^N$ (N=0, 1, 2, . . . ) as it goes from the first to fourth orifices 31a to 34a. Accordingly, if the maximal flow volume that can pass through the first orifice 31a is "X," the maximal flow volume that can pass through the second orifice 32a becomes "2X," the maximal flow volume through the third orifice 33a becomes "4X," and the maximal flow volume through the fourth orifice 34a becomes "8X." Since the flaps are independently operated, the four flaps corresponding to the four orifices can control the flow volume in $2^4(=16)$ steps, for example.

Figure 10A:
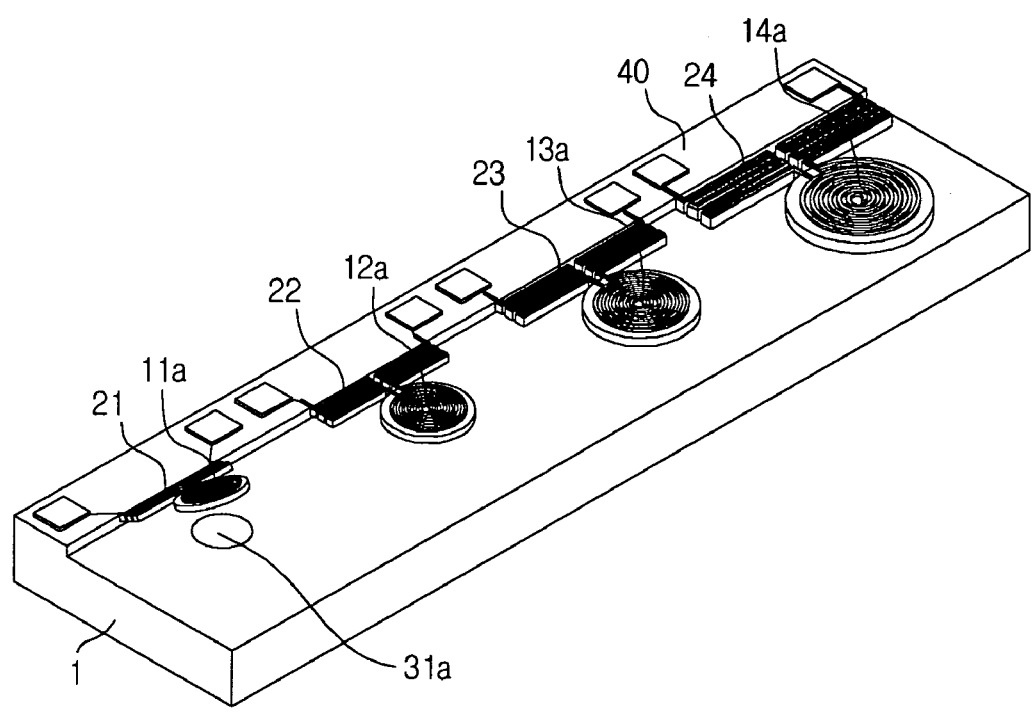
FIGS. 10A and 10B are perspective views of a flow control valve depicted in FIG. 9, illustrating an alternative method for controlling a flow rate.
Figure 10B:
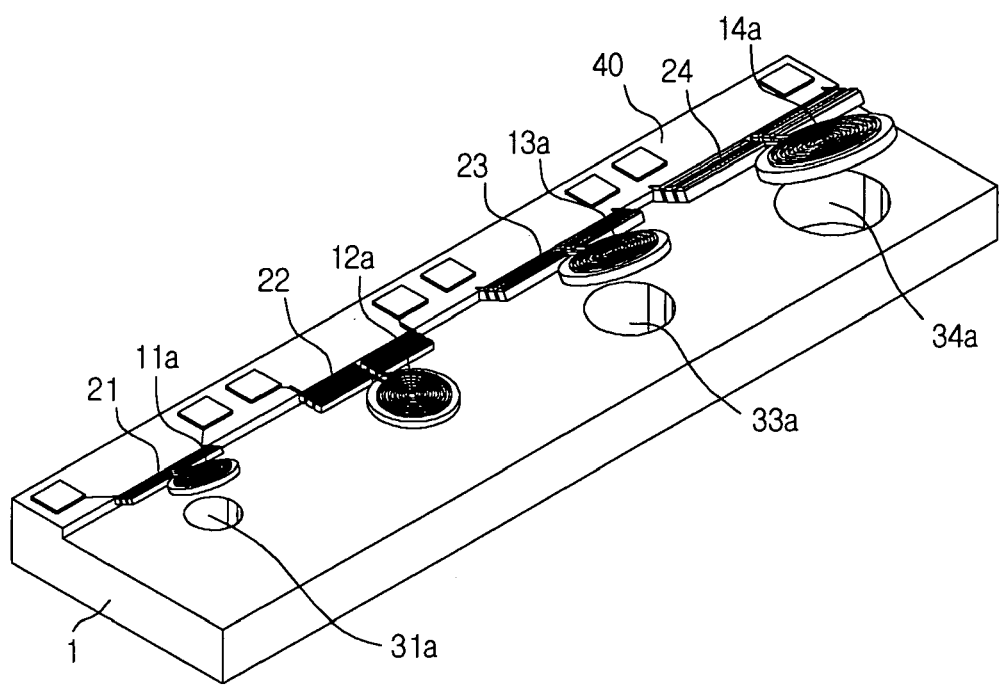

FIGS. 10A and 10B show the flow control valve depicted in FIG. 9 and illustrate an alternative method for controlling a flow rate. In FIG. 10A, when only the first orifice 31a is opened, the total flow mount through the first orifice 31a becomes "X." Referring to FIG. 10B, when the first, third and fourth flaps 11a, 13a and 14a are opened, the total flow volume through the first, third and fourth orifices 31a, 33a and 34 becomes "X+4X+8X." Accordingly, when the flaps are independently controlled, the flow volume can be controlled by an amount "X" in 16 steps from 0X (where all of the flaps are closed) to 15X (where all of the flaps are opened). Furthermore, when the number of orifices is "M (a predetermined natural number)," the flow volume can be controlled in $2^M$ steps, for example.

Figure 11A:
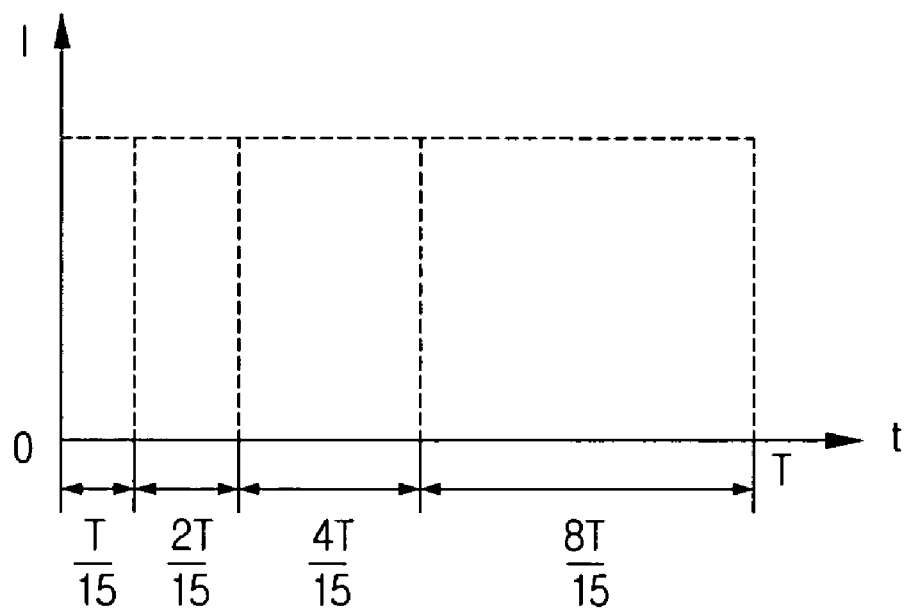
FIGS. 11A to 11C are graphs illustrating an alternative method for controlling a flow rate using a pulse width modulation (PWM) method in a flow control valve according to an embodiment of the present invention.
Figure 11B:
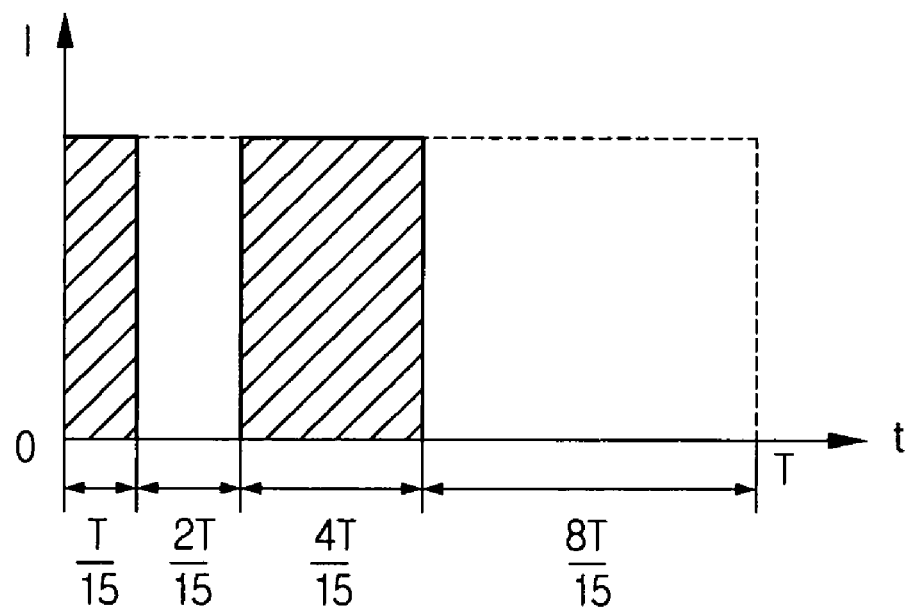
Figure 11C:
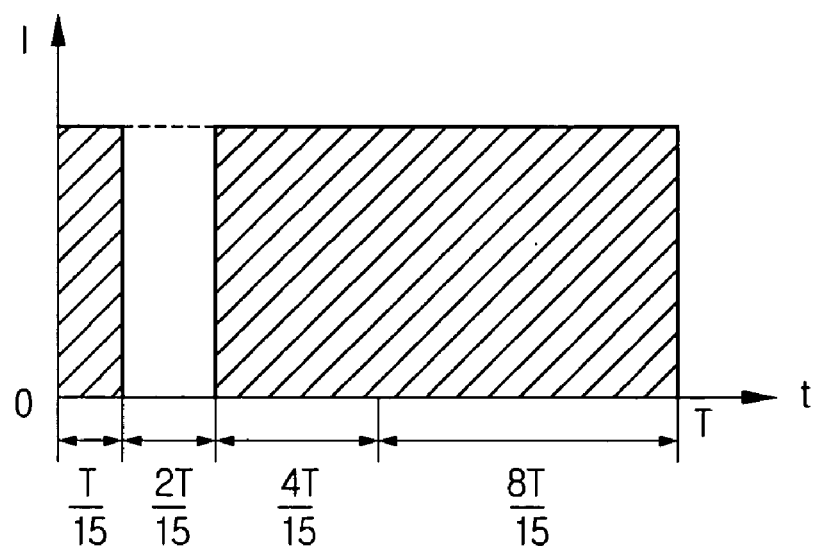

FIGS. 11A to 11C show graphs illustrating an alternative method for controlling a flow rate using a pulse width modulation (PWM) method in a flow control valve according to one embodiment of the present invention. In FIGS. 11A to 11C, one cycle is divided into four sections T/15, 2T/15, 4T/15, and 8T/15. Therefore, the flow volume can be controlled in 16 steps by the combinations of the four sections (0+T+2T+4T+8T). To control the flow volume in 16 steps, a digital 4-bit pulse width modulation method is preferably used. In this embodiment, although the one cycle is divided into four sections, the present invention is not limited to four sections such that the cycle can be divided into eight or sixteen sections, for example.

As shown in FIG. 11B, if the total flow volume for one cycle is "X" (as indicated by the shaded portions), the flow volume for (T/15+4T/15) is T/3, which becomes "X/3." In FIG. 11c, when the flap is controlled for 13T/15 (T/15+4T/15+8T/15), the flow volume becomes "13X/15."

Since such a flow rate control method using the PWM method is totally different from those of the flow rate control methods previously described, the flow rate in the present invention may be more precisely controlled by combining the PWM method and the aforementioned methods. For example, when the 4-bit PWM method is combined with the method depicted in FIG. 9, the flow rate can be controlled in $2^4 \times 2^4 (=2^8)$ steps. Therefore, when the 4-bit PWM method is combined with the first to third methods, the controllable flow volume can be reduced as much as $(1/2)^N$, and the control steps can be increased by $2^N$ times, for example.

Figure 12A:
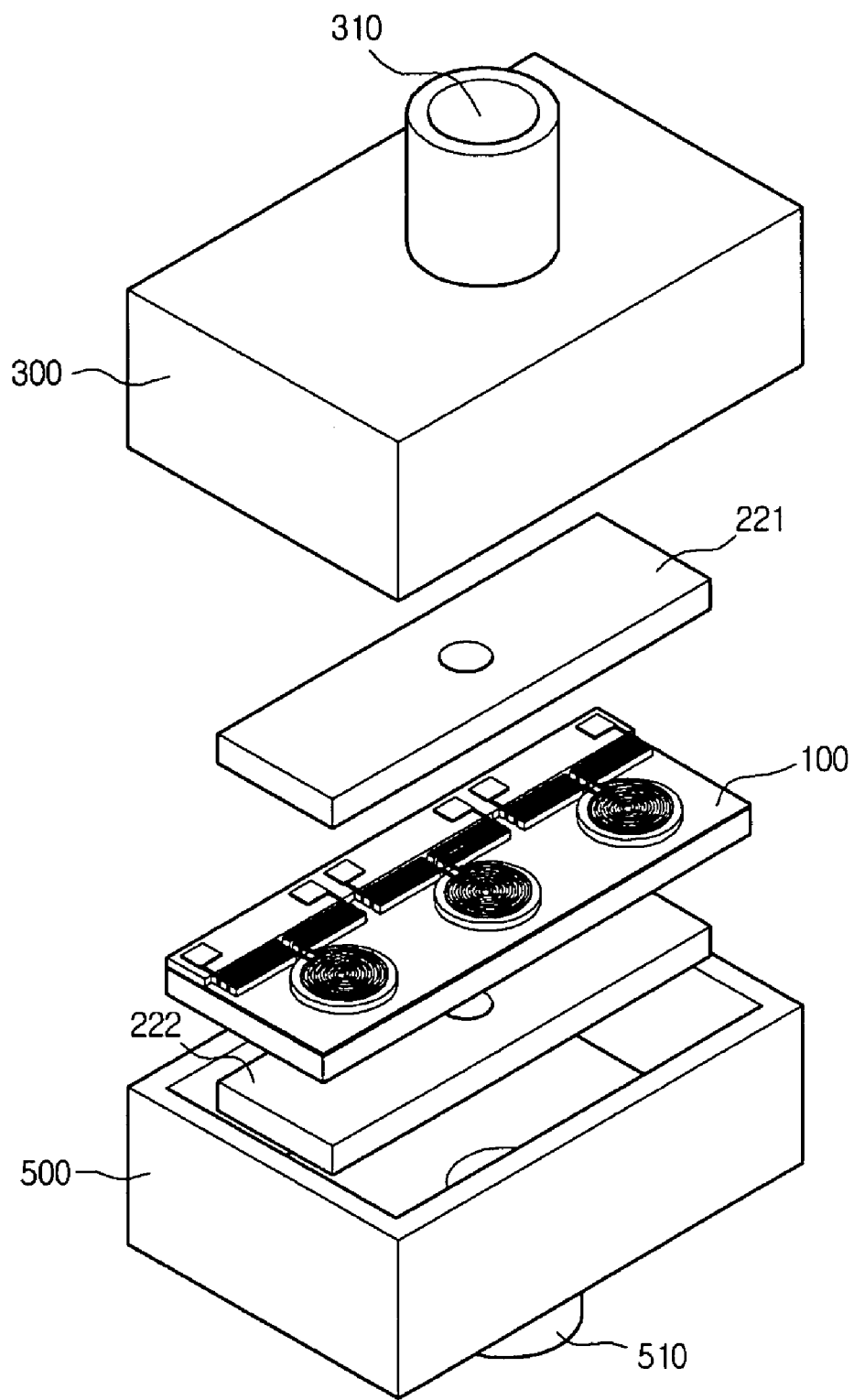
FIGS. 12A and 12B are respectively perspective and sectional views of a flow control valve apparatus according to an embodiment of the present invention.
Figure 12B:
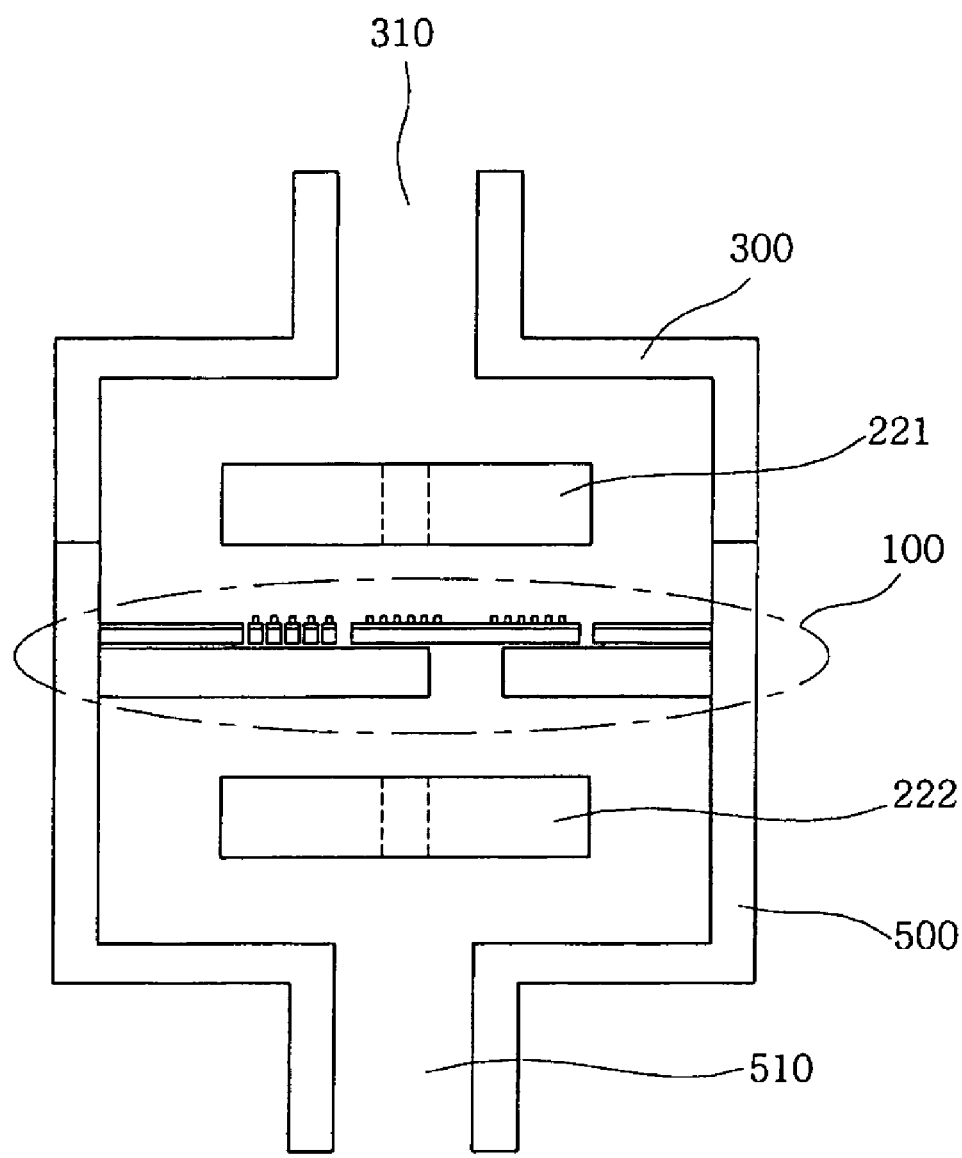

FIGS. 12A and 12B show a flow control valve apparatus according to a preferred embodiment of the present invention. As shown, this embodiment of the present invention comprises an upper hollow housing 300 provided with an inlet flow channel 310, and a lower hollow housing 500 provided with an outlet flow channel 510, wherein the upper and lower housings 300 and 500 are coupled to form a space therein. The apparatus further comprises a flow control valve 100 mounted within the space formed by the upper and lower hollow housings 300 and 500, and a pair of permanent magnets 221 and 222 disposed above and beneath the flow control valve 100, respectively.

Preferably, each of the magnets 221 and 222 is provided with at least one hole to allow the fluid to flow to and away from the flow control valve 100. Additionally, the flow control valve is mounted adjacent to the inner lateral surfaces of the housings 300 and 500 so as to seal at least the inlet flow channel 310 from the outlet flow channel 510. Therefore, fluid introduced through the inlet flow channel 310 can be exhausted through the outlet flow channel 510 only by the control of the flaps of the flow control valve 100.

Furthermore, the flow control apparatus may also comprise an orifice that adiabatically expands so that the flow control valve 100 can be used as an adiabatic expansion valve. When fluid pressure at the inlet flow channel 310 is greater than that at the outlet flow channel 510, higher pressure fluid is injected toward the outlet flow channel 510 through the narrow passage defined by the orifice. Therefore, the flow control valve 100 can be used as an adiabatic expansion valve due to the expansion of volume of fluid and reduction of temperature.

Also, by displacing the flap to linearly adjust the orifice, the flow control valve can be used in a linear expansion valve to control the flow volume. Accordingly, the flow control valve apparatus can bi-directionally control the flow volume, such as when the fluid pressure at the inlet flow channel 310 is less than that at the outlet flow channel 510 and fluid flow is reversed. The above-described flow control valve apparatus can be used in a variety of applications such as an air-conditioner and a refrigerator.

Since each component of the flow control valve apparatus, as described above, is manufactured with micro-machining technology, the number of the components is reduced, thereby facilitating and reducing the cost of manufacturing. Furthermore, since the digital driving is possible, the flow rate can be precisely controlled using a simple driving circuit. Finally, since the flow control valve can reduce the size and manufacturing costs of a heat exchange system by being used as a linear expansion valve for controlling a flow rate of refrigerants, expansion and cooling performances of indoor and outdoor units is improved.

It will be apparent to those skilled in the art that various modifications and variations can be made in the present invention without departing from the spirit or scope of the invention. Therefore, the foregoing description of these embodiments of the present invention has been presented for the purposes of illustration and description. It is not intended to be exhaustive or to limit the invention to the precise form disclosed. Thus, it is intended that the present invention cover the modifications and variations of this invention provided they come within the scope of the appended claims and their equivalents. Preferred embodiments were shown in the context of flow control valves having four orifices. In alternative embodiments, any number of orifices can be substituted for the present invention.

What is claimed is:

1. A flow control valve comprising:
   a substrate defining at least one orifice through which a fluid can flow;
   a support member formed on a first surface of the substrate, wherein the support member is formed adjacent to the at least one orifice;
   at least one flap corresponding to the at least one orifice, wherein the at least one flap extends from the support member to fittingly engage the at least one orifice in a first and second position;
   a pair of elastic flexures connecting the support member to the at least one flap, wherein the pair of elastic flexures provides an elastic restorative force proportional to a displacement of the at least one flap between the first and second positions; and
   a driving means for displacing the at least one flap between the first and second positions to control fluid flow through the at least one orifice.

2. The flow control valve of claim 1, wherein when the flap is displaced in the first position, the fluid flow through the at least one orifice is minimized.

3. The flow control valve of claim 2, wherein when the flap is displaced in the second position, the fluid flow through the at least one orifice is maximized.

4. The flow control valve of claim 1, wherein the driving means comprises:
   a pair of electrode pads formed a distance apart on a first surface of the support member;
   a coil having first and second ends electrically connected to the pair of electrode pads, respectively, wherein the coil is formed on a first surface of the flap;
   at least one permanent magnet disposed above the flap; and
   at least one permanent magnet disposed below the flap.

5. The flow control valve of claim 4, wherein the electrode pads and the coil comprise a conductive material.

6. The flow control valve of claim 4, further comprising a pair of connecting members, wherein each connecting member is formed on each elastic flexure to connect the pair of electrode pads to the coil.

7. The flow control valve of claim 1, wherein the flow control valve is manufactured by a batch process using a micro-machining technology.

8. The flow control valve of claim 1, wherein at least one of the substrate, the support member, the elastic flexure, and the flap are comprised of silicon.

9. The flow control valve of claim 1, further comprising an oxide layer formed between the substrate and the support member.

10. The flow control valve of claim 1, wherein the orifice is circular in shape.

11. The flow control valve of claim 1, wherein the flap is circular in shape.

12. The flow control valve of claim 1, wherein the elastic flexure is formed in a zigzag shape.

13. The flow control valve of claim 1, wherein the elastic flexure comprises a cantilever.

14. The flow control valve of claim 1, wherein the elastic flexure comprises a torsion beam.

15. The flow control valve of claim 1, further comprising a plurality of orifices and a corresponding plurality of flaps, wherein the plurality of orifices have approximately equivalent areas and the fluid flow through each orifice is controlled by displacing each of the plurality of flaps individually.

16. The flow control valve of claim 15, wherein a maximal displacement is associated with each of the plurality of flaps and the maximal displacement of each of the plurality of flaps differs from the other flaps.

17. The flow control valve of claim 1, further comprising a plurality of orifices and a corresponding plurality of flaps, wherein a circumference of each of the plurality of orifices differs from the other orifices and the fluid flow is controlled by displacing each of the plurality of flaps individually.

18. The flow control valve of claim 1, wherein the fluid flow rate is controlled by a method comprising pulse width modulation (PWM).

19. A flow control valve apparatus comprising:
   an upper housing comprising an inlet flow channel;
   a lower housing comprising a outlet flow channel, wherein the lower housing is coupled to the upper housing to form a space therein;
   a flow control valve mounted within the space defined by the upper and lower housings and comprising at least one flap which is displaced by an electromagnetic force to control a fluid flow exiting through the outlet flow channel; and
   a pair of permanent magnets, wherein each permanent magnet comprises at least one orifice and is disposed above and under the flow control valve, respectively.

20. The flow control valve apparatus of claim 19, wherein the flow control valve apparatus is manufactured by a batch process using a micro-machining technology.

21. The flow control valve apparatus of claim 19, wherein the flow control valve further comprises:
   a substrate defining at least one orifice through which a fluid flows;
   a support member formed on a first surface of the substrate, wherein the support member is formed adjacent to the at least one orifice and the at least one flap extends from the support member to open and close the at least one orifice;
   a pair of elastic flexures connecting the support member to the at least one flap, wherein the pair of elastic flexures provides an elastic restorative force proportional to a displacement of the at least one flap;
   a pair of electrode pads formed a distance apart on a first surface of the support member; and
   a coil having first and second ends electrically connected to the pair of electrode pads, respectively, wherein the coil is formed on a first surface of the flap.

22. The flow control valve apparatus of claim 21, wherein the flow control valve further comprises a pair of connecting members, wherein each connecting member is formed on each elastic flexure to connect the pair of electrode pads to the coil.

23. The flow control valve apparatus of claim 19, wherein a pressure difference is generated between the inlet flow channel and the outlet flow channel.

* * * * *